July 21, 1925.

A. W. SPANKUS ET AL

DUMPING TRUCK

Filed Dec. 14, 1920

Adolph W. Spankus
Henry Myatt
INVENTORS

BY Erwin Wheeler & Woolard
ATTORNEYS.

July 21, 1925.  
A. W. SPANKUS ET AL  
DUMPING TRUCK  
Filed Dec. 14. 1920
1,546,414
2 Sheets-Sheet 2
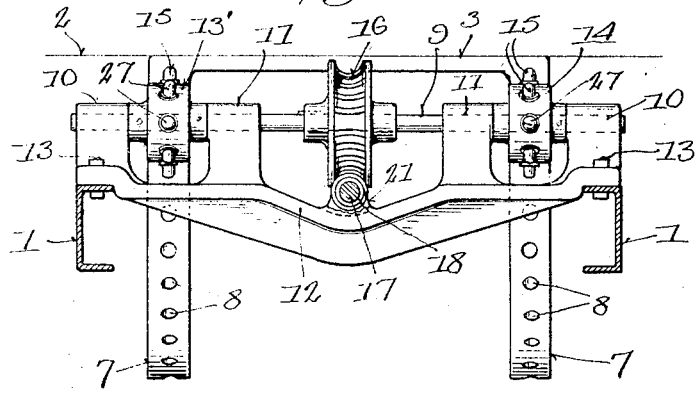
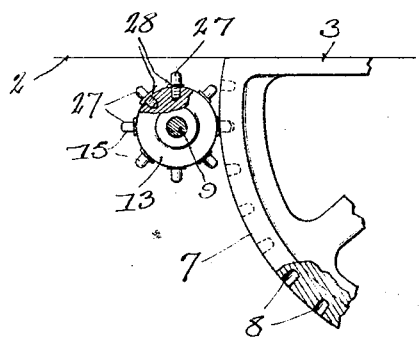 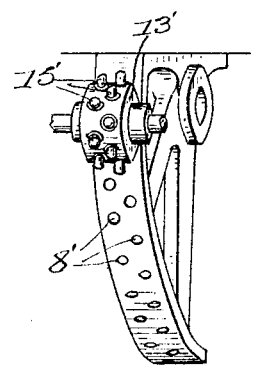
Adolph W. Spankus  
Henry Utzat  
INVENTORS
BY  
Erwin Wheeler & Woolard  
ATTORNEYS.

Patented July 21, 1925.

1,546,414

UNITED STATES PATENT OFFICE.

ADOLPH W. SPANKUS AND HENRY UTZAT, OF MILWAUKEE, WISCONSIN.

DUMPING TRUCK.

Application filed December 14, 1920. Serial No. 430,657.

*To all whom it may concern:*

Be it known that we, ADOLPH W. SPANKUS and HENRY UTZAT, citizens of the United States, residing at Milwaukee, county of Milwaukee, and State of Wisconsin, have invented new and useful Improvements in Dumping Trucks, of which the following is a specification.

This invention relates to dumping trucks and is particularly directed to that type of truck in which a hopper is pivoted upon a main body and is tilted into dumping position.

Objects of this invention are to provide a simple and efficient mechanism for tilting the hopper to dumping position; to avoid duplication of parts and needless exposure of the hoisting mechanism to breakage; to provide an inexpensive and easily repaired mechanism; and to provide a hoisting mechanism which is preeminently adapted for heavy duty.

Further objects are to provide a hoisting mechanism equipped with gears having tempered teeth, such teeth conveniently being of a different temper from the body of the gear; to provide a gear for hoisting trucks which has removable teeth; to provide a hoisting truck mechanism in which the parts most likely to become broken may be replaced by unskilled labor; and to provide hoisting truck mechanism in which the gear teeth may be separately tempered without necessitating expensive tempering operations for the entire gear body.

Embodiments of the invention are shown in the acompanying drawings in which:

Fig. 3 is a fragmentary sectional view on the line 3—3 of Fig. 1.

Fig. 4 is a side elevation of the segmental gear and driving pinion.

Fig. 5 is a perspective view of a modified form of segmental gear and driving pinion.

Figure 1:
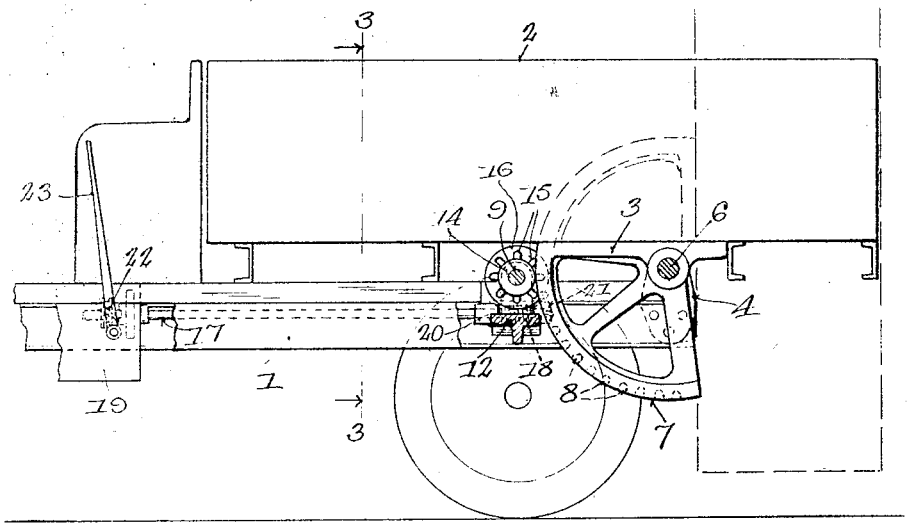
Fig. 1 is a fragmentary side elevation of a truck embodying the invention, showing in dotted lines the position the hopper assumes when in extreme dumping position.
Figure 2:
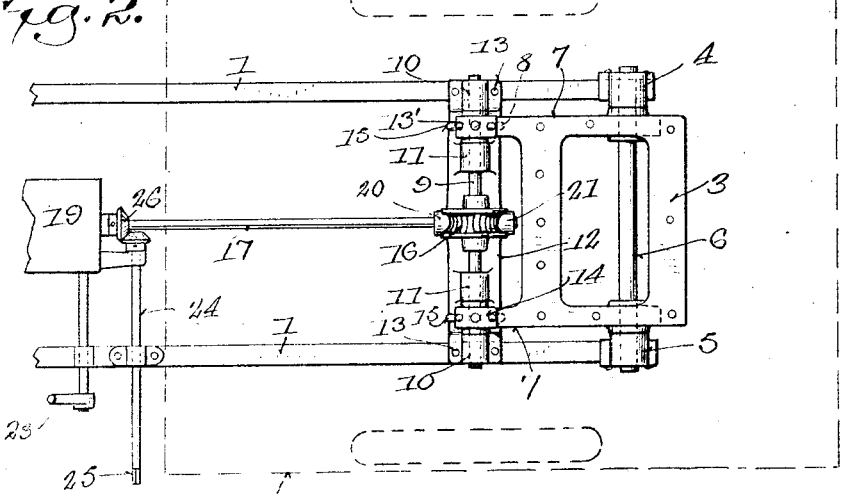
Fig. 2 is a plan view of a structure shown in Fig. 1 with the body removed to more clearly illustrate the construction of elevating mechanism.

The truck comprises a main body or chassis 1 upon which the hopper 2 normally rests. The hopper is pivotally mounted adjacent the rear of the body 1 so as to allow such hopper to move into vertical position, as indicated in dotted lines in Fig. 1, in its extreme dumping position. The pivotal mounting may conveniently be secured by means of a pair of bearings 4 and 5 secured upon the side bars of the chassis 1, and a bracket 3 secured to the under side of the hopper. These members are pivotally joined by means of a pintle 6 which may extend from one side of the machine completely across to the other side thereof.

A pair of segmental gear members 7 are secured to the hopper in axial alignment with the pivotal mounting and may conveniently be formed integrally with the bracket 3. These segmental members are provided with a series of apertures 8 extending from their outer periphery inwardly into the flanged portion of these segmental members. A transverse shaft 9 is mounted in suitable bearings formed in pairs, 10 and 11. A portion at least of such bearings may conveniently be made integrally with the cross supporting member 12 which is secured at 13 upon each side to the side bars of the chassis 1. This transverse shaft is provided with a pair of driving pinions 13' and 14 having pin teeth 15 which are designed to mesh with the openings 8 in the segmental members. A driven worm-wheel 16 is centrally secured upon the transverse shaft 9 and receives its power thru the medium of a single longitudinal shaft 17 and a worm 18. This longitudinal drive shaft 17 may be supported at one end in the transmission casing 19, and at the other end in a pair of bearings 20 and 21 mounted upon opposite sides and closely adjacent to the worm 18.

The elevating mechanism may conveniently be driven by the engine through the medium of the shaft 17, worm 18, and worm wheel 16. A clutch 22, under the control of a hand lever 23 adjacent the driver's seat, serves to connect or disconnect the engine and shaft 17. If desired, provision may be made for manually elevating the hopper by providing a cross shaft 24 adapted to receive a hand crank at 25 and connected with a longitudinal drive shaft 17 by means of a pair of beveled gears 26.

A modified form of construction is illustrated in Fig. 5 in which the openings 8' and the pins 15' are arranged in cooperative staggered relation. This construction secures additional strength over that disclosed in detail in Figs. 3 and 4 and may advantageously be used where heavy duty is imposed upon the hoisting mechanism. It will be noted that by this staggered arrangement of pins a smooth driving is secured.

In both forms of this invention, the driving pinion 14, or 13', is provided with a series of threaded openings extending inwardly from its periphery. A series of removable, hardened, round pins 27 are correspondingly threaded and are screwed into the threaded openings, a shoulder 28 conveniently forming a seat or stop for the threaded pin 27. These pins 27 are hardened and tempered to secure maximum wearing qualities and as they are distinct from the body portion of the driving pinion, such tempering or hardening may be readily and cheaply done. The body portions of the driving pinions and segmental members may or may not be of hardened material.

By providing these removable pin teeth, an elevating mechanism has been provided in which a broken or injured tooth may be readily removed and replaced by a new tooth. It is to be noted that by providing these removable teeth tempering is greatly cheapened and facilitated as it is not necessary to temper the entire pinion. It is also to be noted that if a tooth becomes broken or damaged, it may be replaced by unskilled labor without sending the truck to a repair shop and requiring extensive and costly work.

It will further be noted that by providing a single drive shaft and a single driven worm wheel, both unnecessary duplication of mechanism is avoided, and also unnecessary and dangerous exposure of the elevating mechanism is avoided.

We claim:

1. In a dumping truck having a chassis, a hopper pivotally mounted adjacent the rear end of said chassis and dumping mechanism comprising a pair of segmental gears each secured to opposite sides of said hopper, a pair of pinions each meshing one with said segmental gears, a transverse shaft for said pinions, a worm wheel on said transverse shaft, a longitudinal power shaft and a worm on said longitudinal power shaft meshing with said worm wheel, a transverse bearing member secured to said chassis and provided with a support for said transverse shaft said bearing member being secured to said chassis and provided with bearings disposed upon each side of each pinion and upon each side of said worm.

2. In a dumping truck, the combination with a chassis, of a hopper pivotally mounted on said chassis, a pair of segmental gears secured to said hopper, a transverse shaft, a pair of pinions on said shaft each meshing with one of said segmental gears, a worm wheel on said shaft, a longitudinal power shaft, a worm on said power shaft meshing with said worm wheel, a supporting member mounted on said chassis transversely thereof, a pair of transverse bearing members at each end of said supporting member and each disposed on opposite sides of their corresponding pinions, and a pair of bearing members intermediate of the ends of said supporting member and each disposed at opposite ends of said worm.

3. In a dumping truck including a chassis and a hopper, the combination with a pair of segmental gears pivotally secured to said chassis and integrally secured together to provide a platform for said hopper, a pair of pinions each meshing with a segmental gear, a transverse shaft for said pinions, a worm wheel on said shaft, a power shaft, a worm on said power shaft meshing with said worm wheel, a support for said transverse shaft and worm, said support being provided with a pair of bearings for each of said pinions.

4. In a dumping truck having a chassis and a hopper, the combination with a pair of segmental gears, each disposed upon opposite sides of said chassis and secured together to provide a platform for said hopper and provided with a pivotal connection on said chassis, a pair of pinions each meshing with one of said gears, a transverse shaft for said pinion, and a support for said shaft, said support being provided with bearings for said shaft upon each side of each of said pinions.

ADOLPH W. SPANKUS.
HENRY UTZAT.